US011593844B1

(12) United States Patent
Salehie et al.

(10) Patent No.: US 11,593,844 B1
(45) Date of Patent: Feb. 28, 2023

(54) METHOD, APPARATUS, AND COMPUTER PROGRAM PRODUCT FOR PREDICTIVE INITIAL ELECTRONIC BID VALUE GENERATION FOR NEW DIGITAL CONTENT OBJECTS

(71) Applicant: Groupon, Inc., Chicago, IL (US)

(72) Inventors: Mazeiar Salehie, Bellevue, WA (US); Clovis Aurius Chapman, Seattle, WA (US)

(73) Assignee: GROUPON, INC., Chicago, IL (US)

( * ) Notice: Subject to any disclaimer, the term of this patent is extended or adjusted under 35 U.S.C. 154(b) by 125 days.

(21) Appl. No.: 16/228,503

(22) Filed: Dec. 20, 2018

Related U.S. Application Data (60) Provisional application No. 62/608,436, filed on Dec. 20, 2017.

(51) Int. Cl.
| | | |
|---|---|---|
| *G06Q 30/02* | (2012.01) | |
| *G06Q 30/0273* | (2023.01) | |
| *G06Q 30/0251* | (2023.01) | |
| *G06N 7/00* | (2023.01) | |
| *G06F 16/9538* | (2019.01) | |
| *G06Q 20/12* | (2012.01) | |
| *G06Q 30/0241* | (2023.01) | |

(52) U.S. Cl.
CPC ..... *G06Q 30/0275* (2013.01); *G06F 16/9538* (2019.01); *G06N 7/00* (2013.01); *G06Q 20/1235* (2013.01); *G06Q 30/0256* (2013.01); *G06Q 30/0277* (2013.01)

(58) Field of Classification Search
CPC .......... G06F 16/9538; G06Q 30/02; G06Q 30/0275; G06Q 30/0277; G06Q 30/0256; G06Q 20/1235; G06N 7/00
See application file for complete search history.

(56) References Cited

U.S. PATENT DOCUMENTS

| | | | |
|---|---|---|---|
| 2006/0287919 A1* | 12/2006 | Rubens | G06F 16/951 705/14.58 |
| 2007/0143266 A1 | 6/2007 | Tang et al. | |
| 2015/0058310 A1* | 2/2015 | Mukherjee | G06F 16/9535 707/706 |
| 2015/0186937 A1* | 7/2015 | Lui | G06F 16/313 705/14.54 |
| 2017/0262899 A1* | 9/2017 | Geraghty | G06Q 30/0275 |
| 2017/0262925 A1* | 9/2017 | Rangasamy Kannadasan | G06Q 30/0603 |
| 2018/0129971 A1* | 5/2018 | Vlassis | G06N 20/00 |

FOREIGN PATENT DOCUMENTS

CA          2504106 C      6/2014

OTHER PUBLICATIONS

Wiley Encyclopedia of Computer Science (Year: 2009).*
Approaches to Machine Learning, P. Langley at Carnegie-Mellon University (Year: 1984).*

* cited by examiner

Primary Examiner — Breffni Baggot
(74) Attorney, Agent, or Firm — Alston & Bird LLP (57) ABSTRACT

Embodiments of the present disclosure provide methods, systems, apparatuses, and computer program products for adaptively generating an initial electronic bid value for a new digital content object.

22 Claims, 6 Drawing Sheets

METHOD, APPARATUS, AND COMPUTER PROGRAM PRODUCT FOR PREDICTIVE INITIAL ELECTRONIC BID VALUE GENERATION FOR NEW DIGITAL CONTENT OBJECTS

CROSS-REFERENCE TO RELATED APPLICATIONS

The present application claims priority to U.S. Provisional Application Ser. No. 62/608,436, titled "METHOD, APPARATUS, AND COMPUTER PROGRAM PRODUCT FOR PREDICTIVE INITIAL ELECTRONIC BID VALUE GENERATION FOR NEW DIGITAL CONTENT OBJECTS," filed Dec. 20, 2017, the contents of which are incorporated herein by reference in their entirety.

BACKGROUND

Generating an initial electronic bid value for a new digital content object (e.g., keyword) so as to bid on electronic advertisement placement on a search engine or other page related to the keyword requires a multitude of considerations. Through applied effort, ingenuity, and innovation, many of these identified problems have been solved by developing solutions that are included in embodiments of the present disclosure, many examples of which are described in detail herein.

BRIEF SUMMARY

This specification relates to predictively generating initial electronic bid values for new digital content objects. In one embodiment, a computing entity or apparatus is configured to extract a first device rendered object attribute set associated with the device rendered object. The apparatus is further configured to retrieve a plurality of related device rendered objects from a device rendered object repository. In embodiments, each related device rendered object of the plurality of related device rendered objects has a device rendered object attribute set in common with the first device rendered object attribute set. In embodiments, each related device rendered object has associated therewith a respective related digital content object set comprising a plurality of related digital content objects. The apparatus is further configured to, for each respective related digital content object set of the plurality of related device rendered objects, extract one or more historical digital content object interaction currency values associated with each related digital content object of the related digital content object set. The apparatus is further configured to, using a machine-learning model, programmatically generate an initial electronic bid value for the new electronic digital content object based at least on all of the historical digital content interaction currency values for the plurality of related digital content objects.

Other embodiments include corresponding systems, methods, and computer programs, configured to perform the operations of the apparatus, encoded on computer storage devices.

In embodiments, the apparatus is optionally further configured to associate the new digital content object with a first digital content object campaign type, a first digital content object division size, a first digital content object geolocation, and a first digital content object search match type i.e., exact, phrase and broad).

In embodiments, the new digital content object is a keyword. In embodiments, the machine-learning model is a trained regression model.

In embodiments, the initial electronic bid value is for transmitting to a search engine marketing electronic auction.

In embodiments, the initial electronic bid value is for transmitting to an electronic display network auction.

In embodiments, the new electronic digital content object is associated with an electronic search engine advertisement.

In embodiments, the new electronic digital content object is associated with an electronic display network advertisement.

In embodiments, extracting the first device rendered object attribute set comprises retrieving the first device rendered object attribute set from the device rendered object repository.

In embodiments, extracting the one or more historical digital content object interaction currency values associated with each related digital content object comprises retrieving the one or more historical digital content object interaction currency values from a digital content object repository.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to predictively generating an initial electronic bid value for a new digital content object (i.e., previously unknown digital content object). For example, the methods, apparatus and computer program products described herein are operable to extract a first device rendered object attribute set associated with the device rendered object; retrieve a plurality of related device rendered objects from a device rendered object repository, wherein each related device rendered object of the plurality of related device rendered objects has a device rendered object attribute set in common with the first device rendered object attribute set, and wherein each related device rendered object has associated therewith a respective related digital content object set comprising a plurality of related digital content objects; for each respective related digital content object set of the plurality of related device rendered objects, extract one or more historical digital content object interaction currency values associated with each related digital content object of the related digital content object set; and using a machine-learning model, programmatically generate an initial electronic bid value for the new electronic digital content object based at least on all of the historical digital content interaction currency values for the plurality of related digital content objects.

An initial electronic bid value for a new digital content object submitted to a search engine marketing electronic auction can have a dramatic impact on a lifetime of the digital content object and/or any associated or related device rendered objects (i.e., wasted storage of related device rendered objects). Programmatically generating an efficient initial electronic bid value for the new digital content object without having historical data to consult proves detrimental to the success of a campaign related to the new digital content object.

The inventors have identified that the system resources and time allocated to such initial electronic bid value selections are easily exhausted and compromised as a result of these challenges. The inventors have determined that the ability to predictively generate an initial electronic bid value for a new digital content object, using a machine-learning model and based upon historical data known about related digital content object, would reduce the computing resources and time necessary to perform such generations or selections.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "client profile" refers to a collection of preferences, settings, configurations, client device identifiers, data, and information associated with a specific user. A profile refers therefore to the explicit digital representation of a person's identity and other data or information associated with the user. In some embodiments, a client profile can be used to store a description of characteristics of the user and/or of the client device, as well as credentials, past behaviors, and preferences of the user.

The term "search query" refers to a query for electronic documents or digital content items submitted to a platform by a user utilizing a client device. The term "search results" refers to results returned from such a query. In some examples, a user using the client device may submit a query for "Japanese food" into an interface and the system may return a list of device rendered objects and/or URLs having keywords, metadata, or the like contained therein or associated therewith. The search results thus include the returned list of device rendered objects, all keywords and metadata associated therewith, and an arrangement or ranked order of the returned list.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

In embodiments, each search query has associated data indicating one or more categories, sub-categories, or the like. For example, a search query may be associated with category data such as "beauty, wellness, and healthcare," "food and drink," "leisure offers and activities" and/or "services." The search query may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. It should be understood that each of the attributes discussed in this application, may be in some embodiments a primary or a secondary attribute. A list of exemplary attributes is provided below.

In the present embodiments, digital content objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| Past performance | same merchant & service, same service, same merchant, etc. |
| Category & service | service header, primary deal service, etc. |
| Booking month | holiday, pre-holiday, etc. |
| Maximum capacity | units_avail, etc. |
| Hero score | predicted 30 day bookings, predicted 60 day bookings, etc. |
| Review data | yelp_n_review, yelp_rating, yelp_avil, google_n_review, facebook_fans, etc. |

The clustered or the non-clustered attributes may be used to train a machine-learning model. It should be understood that the selection of attributes or clusters of attributes for training machine-learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

The term "machine-learning model" refers to a machine-learning task. Machine-learning is a method used to devise complex models and algorithms that lend themselves to prediction. A machine-learning model is a computer-implemented algorithm that can learn from data without relying on rules-based programming. These models enable reliable, repeatable decisions and results and uncovering of hidden insights through machine-based learning from historical relationships and trends in the data.

Predictive modeling is a process that uses data mining and probability to forecast outcomes. Each predictive model comprises a number of predictors, which are variables that are likely to influence future results. Once data has been collected for relevant predictors, a predictive model is generated.

A machine-learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine-learning model is a regression model.

The terms "regression model" and "regression analysis" refer to a machine learning and/or predictive modeling task for estimating relationships among variables. Several variables can be modeled and analyzed, where a focus is on a relationship between a dependent variable and one or more independent variables (i.e., predictors). Regression analysis aids in understanding how a value of a dependent variable changes when any one of the independent variables is varied, while the other independent variables are held fixed. Through the use of a regression model, an expected future value of a dependent variable may be programmatically generated based on learned relationships between that dependent variable and one or more independent variables.

The term "ridge regression" refers to a machine learning task that employs regularization to determine a best solution for a problem that does not have a unique solution. For example, suppose the problem at hand is $A \cdot x = b$, where A is a known matrix and b is a known vector. One approach to solve this problem is ordinary least squares (OLS) regression. If a unique x exists, OLS will return the optimal value. However, if multiple solutions exist, OLS may choose any of them. In such a situation, ridge regression is used to prevent overfitting and underfitting. Overfitting occurs when the proposed curve focuses more on noise rather than the actual data. Underfitting occurs when the curve does not fit the data well.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

As used herein, the term "keyword" refers to a search term, word, or phrase that are selected to be rendered as part of a search engine results interface displayed on a graphical user interface of a client device. Content related to the search terms, words, or phrases are rendered for display to a user using a client device whenever the user enters the keyword into a search engine interface (e.g. Google, Bing, Yahoo, Baidu, and the like) via the client device. The keyword may describe or be associated with device rendered objects provided by a device rendered object service. The keyword may be selected by the device rendered object service as a digital content object for which to submit an electronic bid value for search engine marketing to help determine when and where content provided by the device rendered object service may appear on a search engine results page displayed on a graphical user interface for a user using a client device.

As used herein, the term "electronic bid value" refers to a digital representation of an amount of currency a device rendered object service is willing to have deducted from a currency account for a keyword each time a user searches the keyword as described above and interacts, via a client device, with content provided by the device rendered object service that is associated with the keyword. In embodiments, the digital content provided by the device rendered object service is an electronic advertisement.

The term "digital content object interaction" refers to electronic interaction with a digital content object by a client device. In some examples, the digital content object interaction may take the form of an accessing or selection of the digital content object, and/or the like.

In some embodiments, the interaction data (e.g., digital content object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

It should be appreciated that the term "programmatically expected" indicates machine prediction of occurrence of certain events. For example, a "programmatically expected" number of device rendered object interactions by a first user associated with a client device is a number determined by machine prediction specifying the expected number of device rendered object interactions that will be performed by the first user associated with the client device.

As used herein, the term "likelihood" refers to a measure of probability for occurrence of a particular event. For example, the likelihood that a client device will interact with a device rendered object may be a value associated with a specific scale. In some implementations, the machine predictions discussed above are based, at least in part, on the "likelihood" that an event will occur.

The term "search engine electronic advertisement" refers to a digital advertisement for placement on a search engine page. In embodiments, a search engine electronic advertisement has associated therewith one or more digital content objects. In embodiments, a search engine electronic advertisement maybe associated with a particular digital content object according to a certain match type (defined below) and/or according to a certain campaign type (defined below).

The term "display network electronic advertisement" refers to a digital advertisement for placement on an interface (e.g., webpage) associated with a display network. In embodiments, a display network electronic advertisement has associated therewith one or more digital content objects. In embodiments, a display network electronic advertisement maybe associated with a particular digital content object according to a certain match type (defined below) and/or according to a certain campaign type (defined below).

The term "initial electronic bid value" refers to a digital representation of an amount of currency a device rendered object service is willing to have deducted from a currency account for each time a client device interacts with a digital content object (e.g., keyword) by selecting a search engine electronic advertisement associated with the digital content object. In examples, an initial electronic bid value is a maximum amount of digital currency a system is allowed to debit the device rendered object service per interaction (e.g., click) with a search engine electronic advertisement provided by the device rendered object service, where the search engine electronic advertisement is associated with the digital content object.

The term "new digital content object" refers to a digital content object for which the device rendered object service does not have any historical data.

The term "device rendered object attribute set" refers to one or more attributes associated with a device rendered object. Attributes are defined above.

The term "related device rendered objects" refers to device rendered objects that are considered related based on common attributes, divisions, geolocations, and the like.

The term "device rendered object repository" refers to a storage medium or database containing a plurality of device rendered objects.

The term "digital content object set" refers to a plurality of digital content objects grouped into a set.

The term "related digital content object set" refers to a plurality of related digital content objects grouped into a set.

The term "historical" refers to data collected over a duration of network time leading up to a present network time.

The term "digital content object interaction currency value" refers to a currency value associated with any time a client device interacts with a digital content object. As an example, a digital content object (e.g., a keyword) may have associated therewith an interaction currency value (e.g., revenue per click).

The term "digital content object campaign type" refers to an electronic display campaign type associated with a digital content object. For example, a digital content object (e.g., a keyword) may be associated with a campaign type (e.g., geolocation, deal, category based advertisements, coupon, discount, root, voucher).

The term "digital content object division size" refers to a size of a geographical division associated with an digital content object. In some examples, a division size can be one of small, medium, or large. In examples, the division size is related to a population and density of a geographical division.

The term "digital content object geolocation" refers to a physical location associated with a digital content object. In some examples, a digital content object (e.g., a keyword) can be associated with a geolocation (e.g., Chicago).

The term "digital content object search match type" refers to the type of matching intended for a digital content object interaction in a search engine. In examples, a type of search matching can be broad, phrase, or exact level. In examples, a broad search matching may include results broadly relating to a digital content object. In examples, a phrase search matching may include results related to a phrase containing the digital content object. In example, an exact search matching may include results related directly to an exact match with the digital content object.

It will be appreciated that a particular digital content object may be related to several different campaign types and several different match types.

The term "geolocation based initial electronic bid value" refers to an initial electronic bid value generated for a digital content object that is specific to a geolocation. For example, the digital content object may have a first initial electronic bid value associated therewith for when the first initial electronic bid value is for the digital content object in the context of a first geolocation (e.g., Seattle). The digital content object may also have a second electronic bid value associated therewith for when the second initial electronic bid value is for the digital content object in the context of a second geolocation (e.g., London).

The term "division size based initial electronic bid value" refers to an initial electronic bid value generated for a digital content object that is specific to a division size. For example, the digital content object may have a first initial electronic bid value associated therewith for when the first initial electronic bid value is for the digital content object in the context of a first division size (e.g., small). The digital content object may also have a second electronic bid value associated therewith for when the second initial electronic bid value is for the digital content object in the context of a second division size (e.g., medium).

The term "campaign type based initial electronic bid value" refers to an initial electronic bid value generated for a digital content object that is specific to a campaign type.

For example, the digital content object may have a first initial electronic bid value associated therewith for when the first initial electronic bid value is for the digital content object in the context of a first campaign type (e.g., coupon). The digital content object may also have a second electronic bid value associated therewith for when the second initial electronic bid value is for the digital content object in the context of a second campaign type (e.g., voucher).

The term "match type based initial electronic bid value" refers to an initial electronic bid value generated for a digital content object that is specific to a match type. For example, the digital content object may have a first initial electronic bid value associated therewith for when the first initial electronic bid value is for the digital content object in the context of a first match type (e.g., phrase). The digital content object may also have a second electronic bid value associated therewith for when the second initial electronic bid value is for the digital content object in the context of a second match type (e.g., exact).

The term "search engine marketing electronic auction" refers to an electronic auction whereby a search engine provider allows for providers such as a device rendered object service to identify digital content objects for which they will transfer a currency value to the search engine provider. When a client device searches for a search string including device rendered objects (e.g., keywords) using a search engine, the search engine provider reviews the pool of currency value offers for digital content objects deemed relevant to the search and enables an auction.

The term "electronic display network auction" refers to an electronic auction whereby an electronic display network provider allows for providers such as a device rendered object service to identify digital content objects for which they will transfer a currency value to the electronic display network provider.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
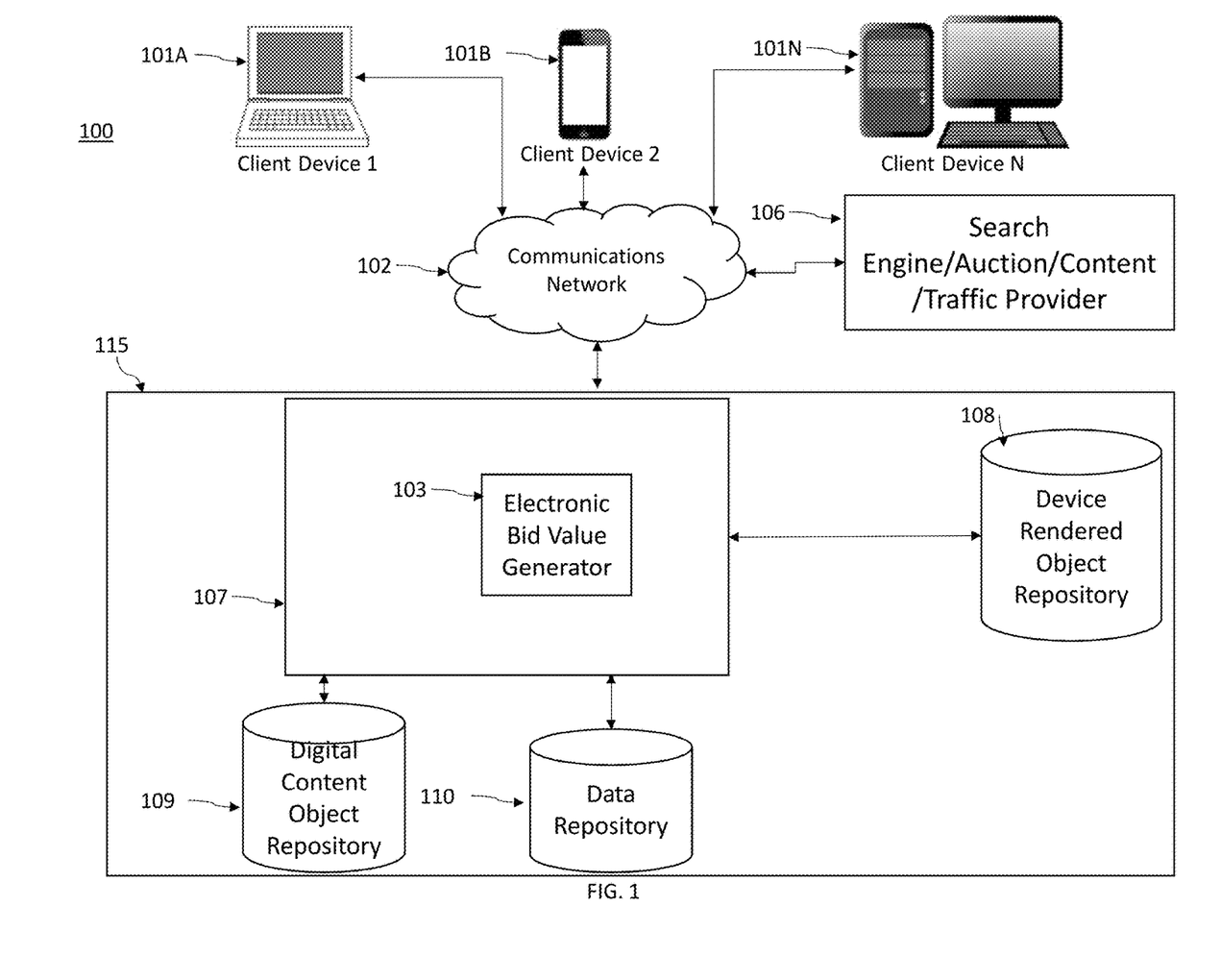
FIG. 1 is a system architecture diagram of a system configured to practice embodiments of the present disclosure.

FIG. 1 illustrates an example computing system within which embodiments of the present disclosure may operate. Client devices may access a device rendered object system 115 via a communications network 104 (e.g., the Internet, LAN, WAN, or the like) using client devices 101A-101N. The device rendered object system 115 may comprise a server 107 in communication with one or more databases or repositories 108, 109, 110. The device rendered object system 115 and the client devices 101A-101N may also access and/or communicate with a search engine provider 106 via communications network 104.

The server 107 may be embodied as a computer or computers as known in the art. The server 107 may provide for receiving of electronic data from various sources, including but not necessarily limited to the client devices 101A-101N. For example, the server 107 may be operable to receive and process device rendered object requests and transactions provided by the client devices 101A-101N.

The databases or repositories 108-111 may be embodied as a data storage device such as a Network Attached Storage (NAS) device or devices, or as a separate database server or servers. The databases 108-111 include information accessed and stored by the server 107 to facilitate the operations of the device rendered object system 115. For example, the databases 108-111 may include, without limitation, client profiles for users of the system 115, traffic data, digital content objects and associated features/attributes, device rendered objects and associated features/attributes, and the like.

The server 107 may comprise an electronic bid value generator 103 for generating electronic bid values for digital content objects.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 and/or the search engine provider 106 via a web browser. As yet another example, the client device 101A-101N may include various hardware or firmware designed to interface with the system 115 and/or the search engine provider 106.

Example Apparatus for Implementing Embodiments of the Present Disclosure

Figure 2:
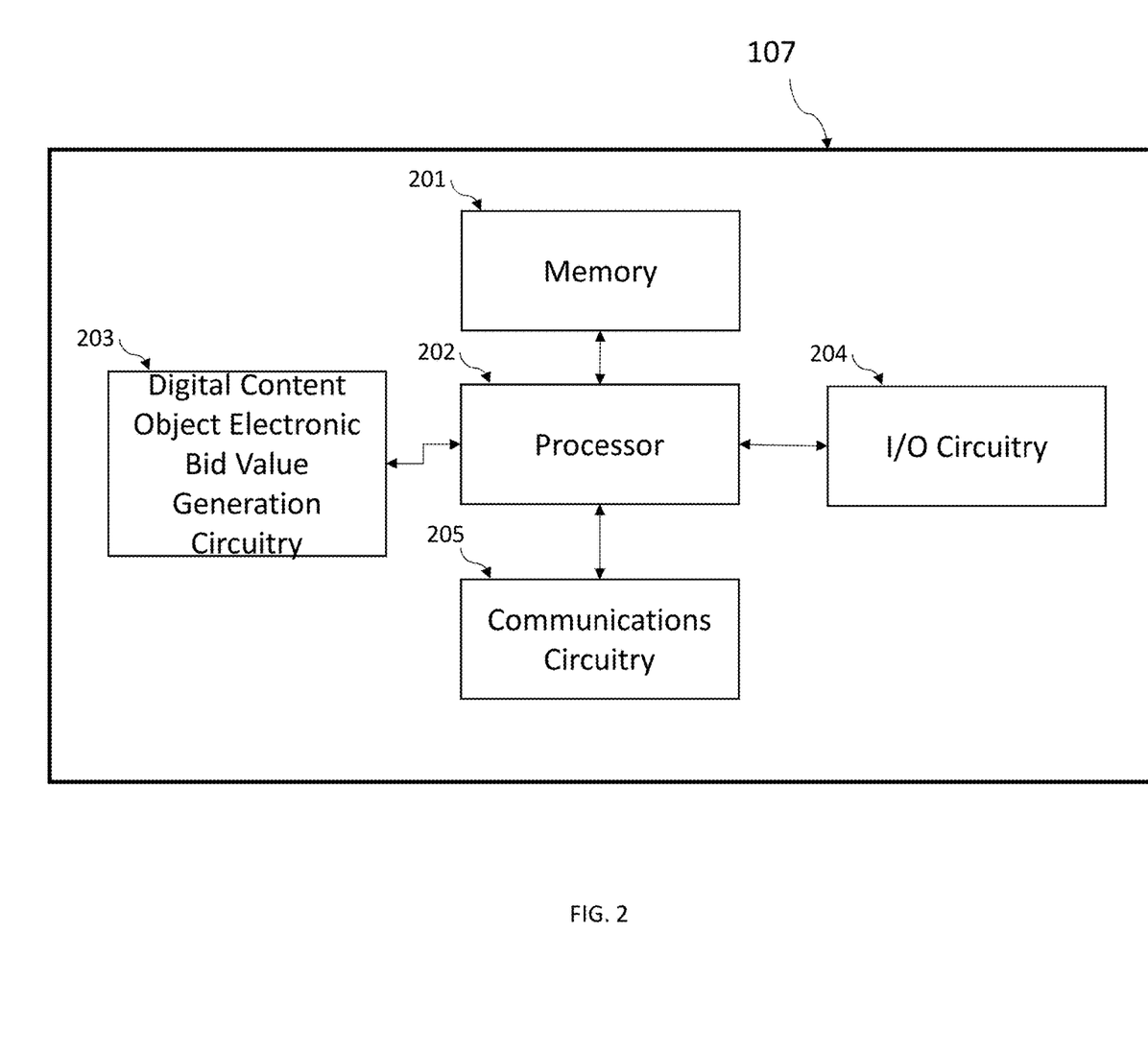
FIG. 2 is an exemplary schematic diagram of a computing entity according to one embodiment of the present disclosure.

The server 107 may be embodied by one or more computing systems, such as apparatus 200 shown in FIG. 2. The apparatus 200 may include a processor 202, a memory 201, input/output circuitry 204, communications circuitry 205, and digital content object electronic bid value generation circuitry 203. The apparatus 200 may be configured to execute the operations described herein. Although these components 201-205 are described with respect to functional limitations, it should be understood that the particular implementations necessarily include the use of particular hardware. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Digital content object electronic bid value generation circuitry 203 includes hardware configured to generate electronic bid values for digital content objects. The digital content object electronic bid value generation circuitry 203 may utilize processing circuitry, such as the processor 202, to perform these actions. It should also be appreciated that, in some embodiments, the digital content object electronic bid value generation circuitry 203 may include a separate processor, specially configured field programmable gate array (FPGA), or application specific interface circuit (ASIC). The digital content object electronic bid value generation circuitry 203 may be implemented using hardware components of the apparatus configured by either hardware or software for implementing the functions described herein.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Adaptively Generating Initial Electronic Bid Values for Digital Content Objects According to embodiments of the present disclosure, a new digital content object is received where the new digital content object (e.g., keyword) is associated with a first device rendered object. A plurality of related device rendered objects are retrieved based upon commonalities between the first device rendered object and the plurality of related device rendered objects. Each of the related device rendered objects has associated therewith a plurality of related digital content objects (e.g., related keywords), and each of the related digital content objects has associated therewith historical digital content object interaction currency values. An initial electronic bid value for the new digital content object may be generated, using a machine-learning model (e.g., regression model), based on the historical digital content object currency values associated with the related digital content objects.

Figure 3A:
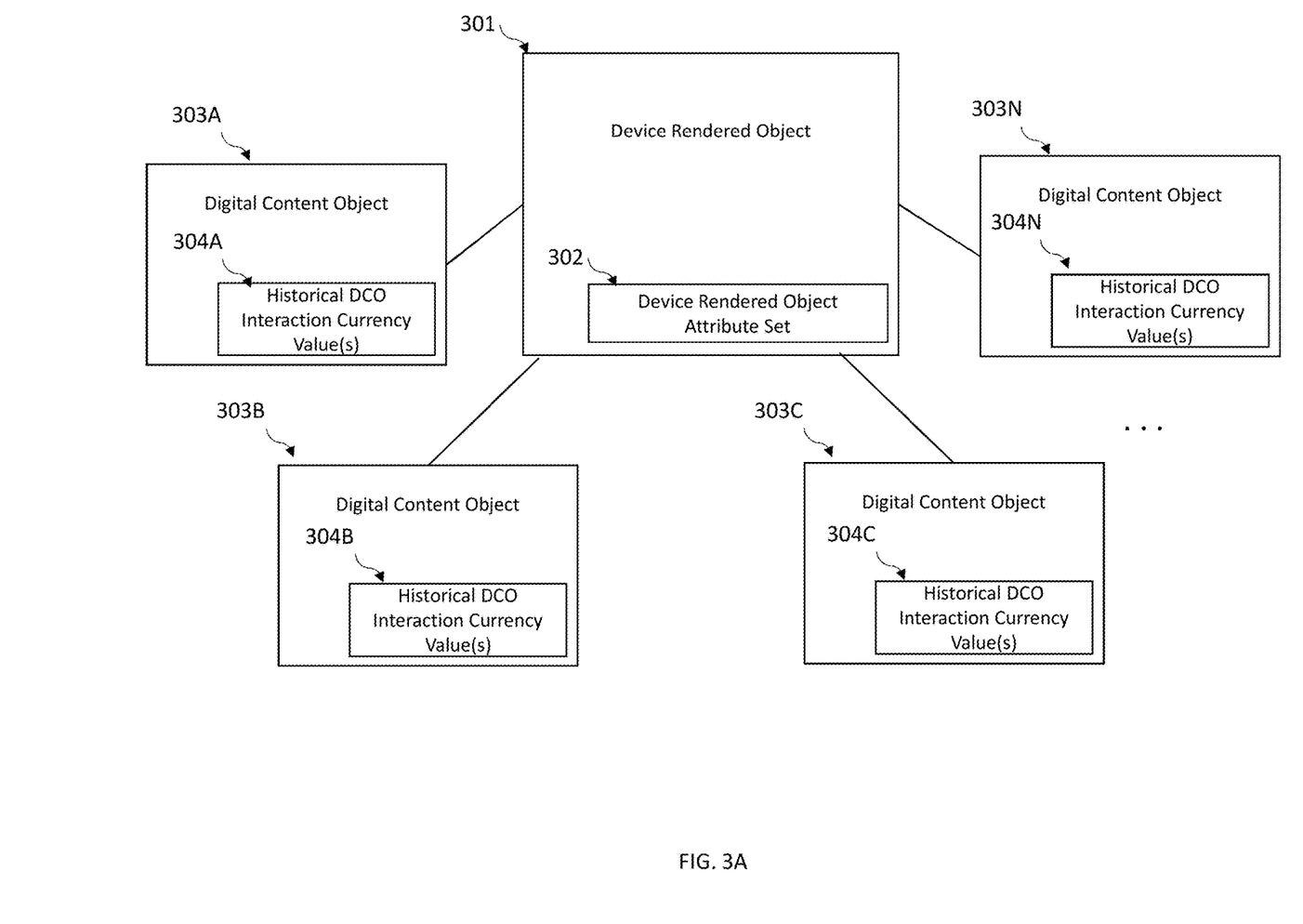
FIG. 3A illustrates an exemplary association diagram for a device rendered object for use with embodiments of the present disclosure.

FIG. 3A illustrates an exemplary association diagram for a device rendered object for use with embodiments of the present disclosure. According to embodiments, a device rendered object 301 has associated therewith a device rendered object attribute set 302. The device rendered object 301 may also be associated with one or more digital content objects 303A-303N. Each of the digital content objects 303A-303N has associated therewith one or more historical digital content object interaction currency values 304A-304N.

Figure 3B:
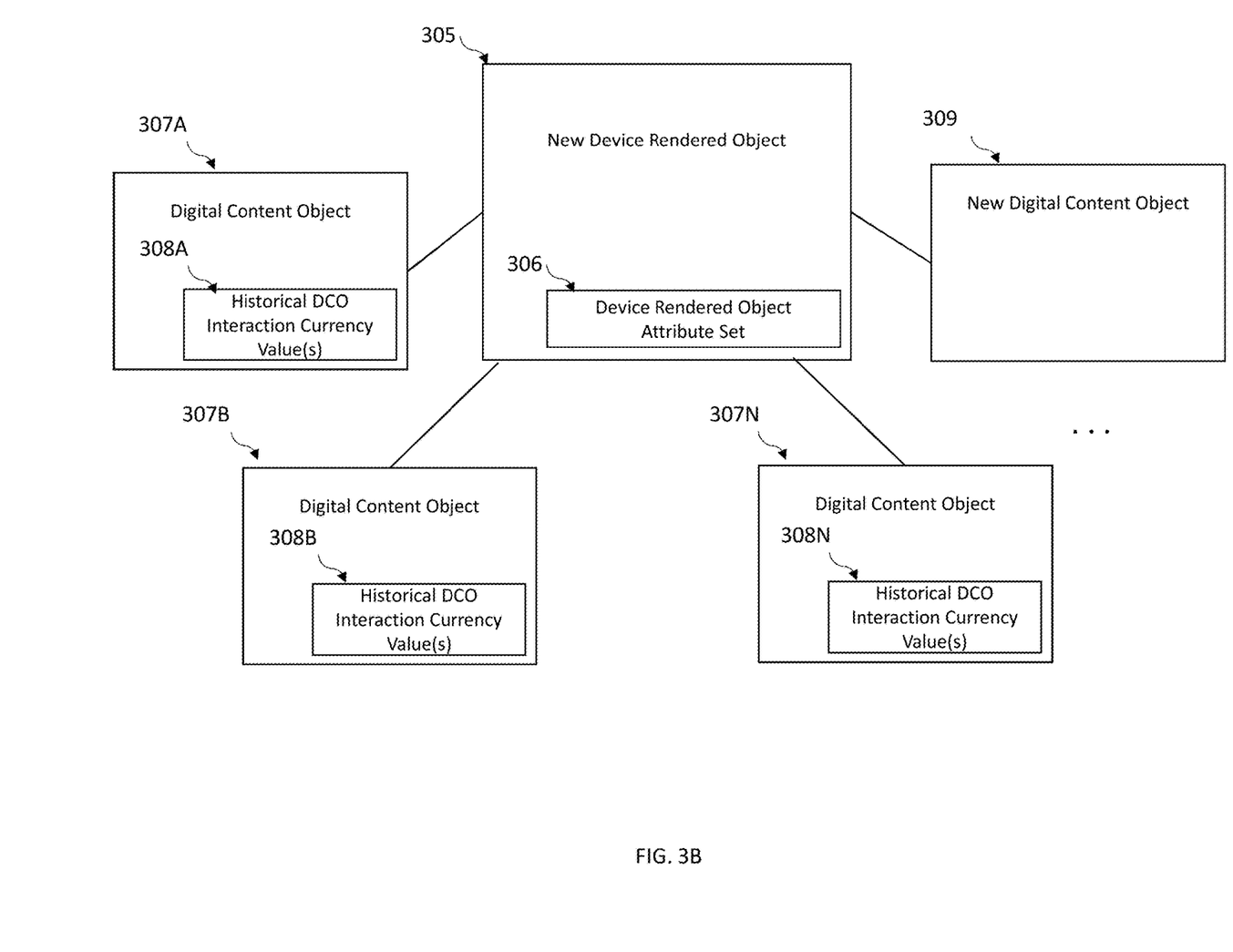
FIG. 3B illustrates an exemplary association diagram for a new device rendered object for use with embodiments of the present disclosure.

FIG. 3B illustrates an exemplary association diagram for a new device rendered object for use with embodiments of the present disclosure. According to embodiments, a new device rendered object 305 has associated therewith a device rendered object attribute set 306. The new device rendered object 305 may also be associated with one or more digital content objects 307A-307N, each having associated therewith one or more historical digital content object interaction currency values 308A-308N. However, in embodiments, the new device rendered object 305 may be associated with a new digital content object 309 for which no known data is available (i.e., no historical digital content object interaction currency values are associated with the new digital content object yet).

Figure 4A:
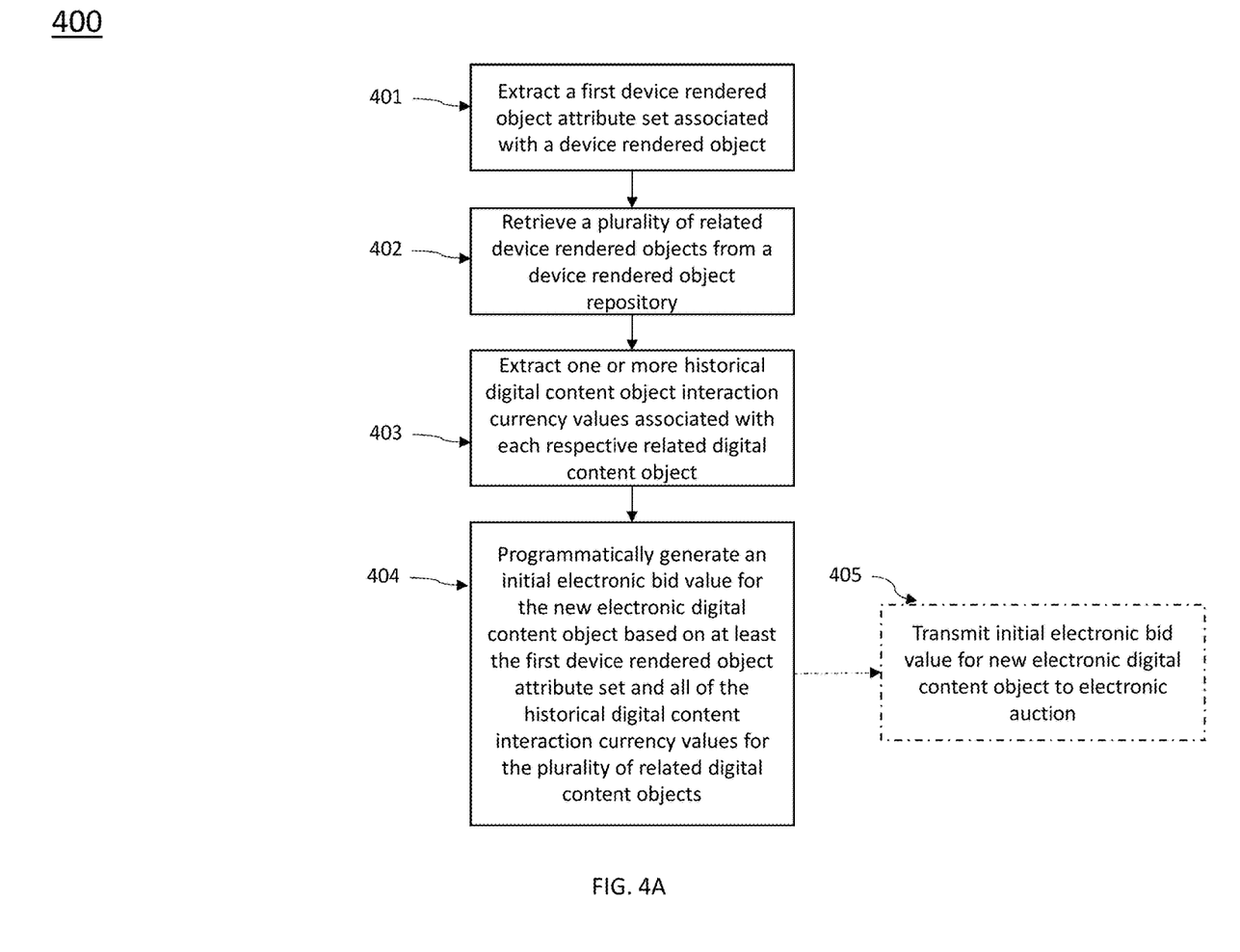
FIGS. 4A and 4B illustrate an exemplary initial electronic bid value generation process for use with embodiments of the present disclosure.
Figure 4B:
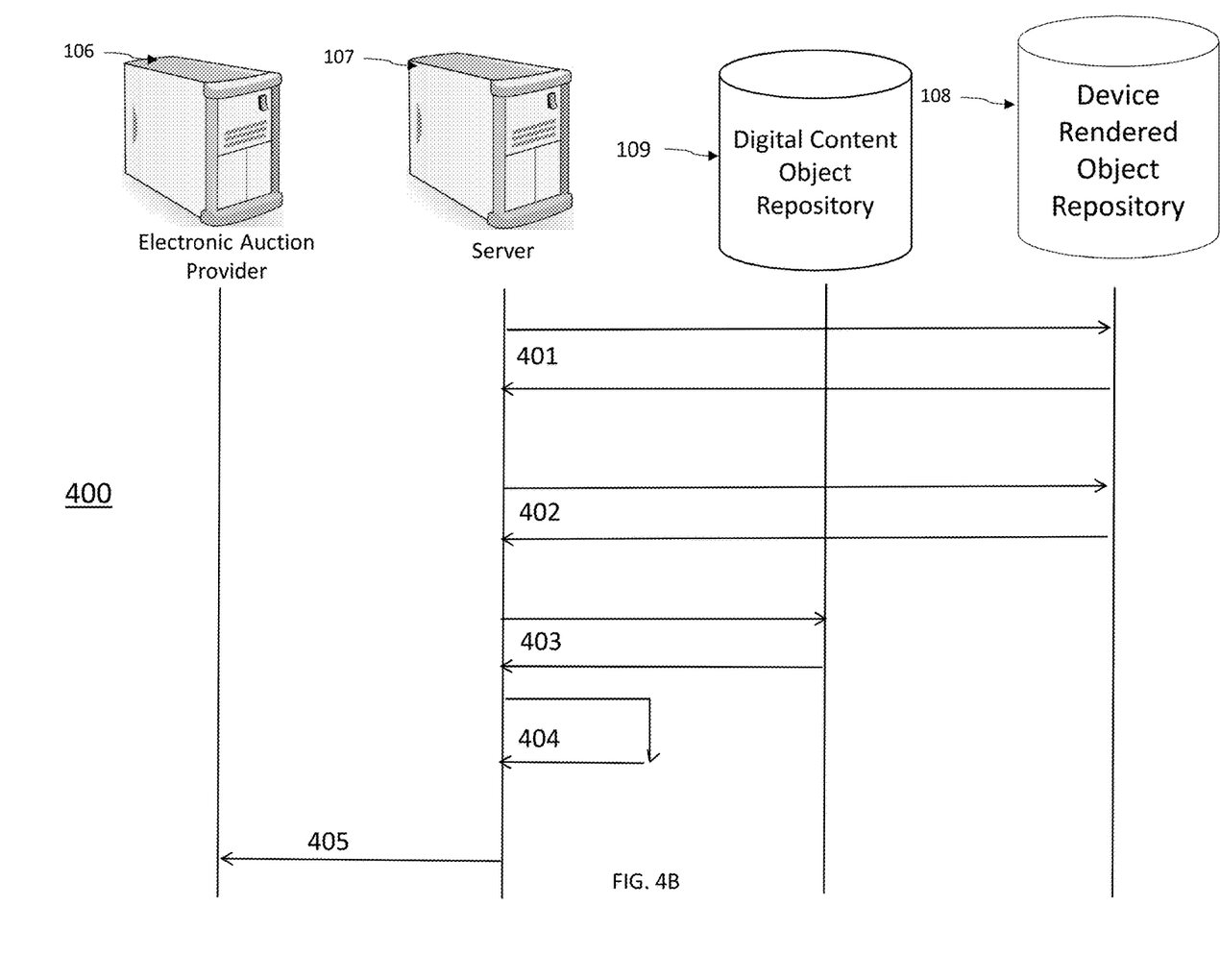

FIGS. 4A and 4B illustrate an exemplary initial electronic bid value generation process for use with embodiments of the present disclosure. In embodiments, a process 400 starts with extracting a first device rendered object attribute set associated with the new device rendered object 401. In embodiments, extracting the first device rendered object attribute set associated with the new device rendered object comprises retrieving, by a device rendered object server 107, the first device rendered object set from a device rendered object repository 108. Retrieving the first device rendered object attribute set from the device rendered object repository 108 comprises transmitting a request to the device rendered object repository 108 and receiving a response from the device rendered object repository. In embodiments, the request comprises a device rendered object identifier associated with the new device rendered object. In embodiments, the response comprises the first device rendered object attribute set.

Process 400 continues with retrieving 402 a plurality of related device rendered objects from the device rendered object repository 108. In some embodiments, each related device rendered object of the plurality of related device rendered objects has a device rendered object attribute set in common with the first device rendered object attribute set. In embodiments, retrieving 402 the plurality of device rendered objects from the device rendered object repository 108 comprises transmitting, by the server 107, a request to the device rendered object repository 108 and receiving a response from the device rendered object repository 108. In embodiments, the request comprises the first device rendered object attribute set and an electronic request for all device rendered objects having a device rendered object attribute set that matches the first device rendered object attribute set. In embodiments, the response comprises all related device rendered objects having a device rendered object attribute set in common with the first device rendered object attribute set.

In some embodiments, each related device rendered object has associated therewith a respective related digital content object set comprising a plurality of related digital content objects. In such embodiments, server 107 requests and receives each related digital content object set associated with each related device rendered object from a digital content object repository 109.

Process 400 continues with, for each related digital content object of each respective related digital content object set of the plurality of related device rendered objects, extracting 403 one or more historical digital content object interaction currency values associated therewith. In embodiments, extracting 403 the one or more historical digital content object interaction currency values associated with each related digital content object of each respective related digital content object set of the plurality of related device rendered objects comprises requesting and receiving, by the server 107, the one or more historical digital content object interaction currency values from the digital content object repository 109. In embodiments, the one or more historical digital content object interaction currency values are retrieved at the time of retrieving the related digital content object sets.

Process 400 continues with, using a machine-learning model, programmatically generating 404 an initial electronic bid value for the new electronic digital content object based at least on all of the historical digital content interaction currency values for the plurality of related digital content objects. In embodiments, server 107 programmatically generates 404 the initial electronic bid value using a trained machine-learning model.

In embodiments, process 400 optionally continues with transmitting 405, by the server 107, the initial electronic bid value for the new digital content object to an electronic auction provider 106.

In some embodiments, the machine-learning model is a trained regression model. In some embodiments, a target variable of the trained regression model is a digital content object interaction currency value. In some embodiments, the trained regression model is trained using historical digital content object interaction currency values weighted based on digital content object interaction counts. In embodiments, ridge regression is employed to avoid or minimize overfitting the predictive regression model.

In some embodiments, the new digital content object is a keyword. In some embodiments, the initial electronic bid value is for transmitting to a search engine marketing electronic auction. In some embodiments, the initial electronic bid value is for transmitting to an electronic display network auction. In some embodiments, the new electronic digital content object is associated with an electronic search engine advertisement.

In embodiments, the first device rendered object attribute set comprises one or more of a first digital content object campaign type, a first digital content object division size, a first digital content object geolocation, and a first digital content object search match type.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for predictively generating an initial electronic bid value for a new digital content object associated with a new device rendered object, the apparatus comprising at least one processor and at least one memory including computer program code, the at least one memory and the computer program code configured to, with the at least one processor, cause the apparatus to:

generate, for each of a plurality of training digital content objects, a respective training subset of significant attributes, each respective subset of significant training attributes comprising a first training attribute associated with a training digital content object geolocation and a second training attribute associated with a training digital content object search match type, wherein the first training attribute associated with the training digital content object geolocation is generated based at least on location data received from one or more devices having location services circuitry;

train a machine-learning model using each respective subset of significant training attributes to generate a trained machine-learning model;

extract a first device rendered object attribute set associated with the new device rendered object, the first device rendered object attribute set comprising at least a first attribute associated with a digital content object geolocation and at least a second attribute associated with a digital content object search match type related to a type of matching intended for a digital content object interaction associated with the new digital content object;

transmit a request for a plurality of related device rendered objects to a device rendered object repository, wherein the request comprises a device rendered object identifier associated with the new device rendered object, each related device rendered object of the plurality of related device rendered objects comprising a respective set of executable instructions that, when executed by a processor, renders an object for display, wherein each related device rendered object has a device rendered object attribute set in common with the first device rendered object attribute set, and wherein each related device rendered object has associated therewith a respective related digital content object set comprising a plurality of related digital content objects;

retrieve, from the device rendered object repository, the plurality of related device rendered objects;

for each respective related digital content object set of the plurality of related device rendered objects, extract one or more historical digital content object interaction currency values associated therewith;

programmatically generate, using the trained machine-learning model, an initial electronic bid value for the new electronic digital content object based at least on the first device rendered object attribute set and all of the historical digital content interaction currency values for the plurality of related digital content objects; and transmit the initial electronic bid value to a computing device.

2. The apparatus of claim 1, wherein the first device rendered object attribute set comprises one or more of a first digital content object campaign type and a first digital content object division size.

3. The apparatus of claim 1, wherein the new digital content object is a keyword.

4. The apparatus of claim 1, wherein the trained machine-learning model is a trained linear regression model.

5. The apparatus of claim 1, wherein the computing device is associated with a search engine marketing electronic auction.

6. The apparatus of claim 4, wherein a target variable of the trained regression model is a digital content object interaction currency value.

7. The apparatus of claim 6, wherein the trained regression model is trained using historical digital content object interaction currency values weighted based on digital content object interaction counts.

8. The apparatus of claim 1, wherein the computing device is associated with an electronic display network auction.

9. The apparatus of claim 1, wherein the new electronic digital content object is associated with an electronic search engine advertisement.

10. The apparatus of claim 1, wherein extracting the one or more historical digital content object interaction currency values associated with each related digital content object comprises retrieving the one or more historical digital content object interaction currency values from a digital content object repository.

11. A system for predictively generating an initial electronic bid value for a new digital content object associated with a new device rendered object, the system comprising at least one server and one repository, the at least one server comprising at least one processor and at least one memory including computer program code, the at least one memory and the computer program code configured to, with the at least one processor, cause the system to:

generate, for each of a plurality of training digital content objects, a respective training subset of significant attributes, each respective subset of significant training attributes comprising a first training attribute associated with a training digital content object geolocation and a second training attribute associated with a training digital content object search match type, wherein the first training attribute associated with the training digital content object geolocation is generated based at least on location data received from one or more devices having location services circuitry;

train a machine-learning model using each respective subset of significant training attributes to generate a trained machine-learning model;

extract a first device rendered object attribute set associated with the new device rendered object, the first device rendered object attribute set comprising at least a first attribute associated with a digital content object geolocation and at least a second attribute associated with a digital content object search match type related to a type of matching intended for a digital content object interaction associated with the new digital content object;

transmit a request for a plurality of related device rendered objects to a device rendered object repository, wherein the request comprises a device rendered object identifier associated with the new device rendered object, each related device rendered object of the plurality of related device rendered objects comprising a respective set of executable instructions that, when executed by a processor, renders an object for display, wherein each related device rendered object has a device rendered object attribute set in common with the first device rendered object attribute set, and wherein each related device rendered object has associated therewith a respective related digital content object set comprising a plurality of related digital content objects;

retrieve, from the device rendered object repository, the plurality of related device rendered objects;

for each respective related digital content object set of the plurality of related device rendered objects, extract one or more historical digital content object interaction currency values associated therewith;

programmatically generate, using the trained machine-learning model, an initial electronic bid value for the new electronic digital content object based at least on the first device rendered object attribute set and all of the historical digital content interaction currency values for the plurality of related digital content objects; and transmit the initial electronic bid value to a computing device.

12. The system of claim 11, wherein the first device rendered object attribute set comprises one or more of a first digital content object campaign type and a first digital content object division size.

13. The system of claim 11, wherein the new digital content object is a keyword.

14. The system of claim 11, wherein the trained machine-learning model is a trained linear regression model.

15. The system of claim 11, computing device is associated with a search engine marketing electronic auction.

16. The system of claim 14, wherein a target variable of the trained regression model is a digital content object interaction currency value.

17. The system of claim 16, wherein the trained regression model is trained using historical digital content object interaction currency values weighted based on digital content object interaction counts.

18. The system of claim 11, wherein the computing device is associated with an electronic display network auction.

19. The system of claim 11, wherein the new electronic digital content object is associated with an electronic search engine advertisement.

20. The system of claim 11, wherein extracting the first device rendered object attribute set comprises retrieving the first device rendered object attribute set from the device rendered object repository.

21. The system of claim 11, wherein extracting the one or more historical digital content object interaction currency values associated with each related digital content object comprises retrieving the one or more historical digital content object interaction currency values from a digital content object repository.

22. A computer-implemented method for predictively generating an initial electronic bid value for a new digital content object associated with a new device rendered object, the method comprising:

generating, for each of a plurality of training digital content objects, a respective training subset of significant attributes, each respective subset of significant training attributes comprising a first training attribute associated with a training digital content object geolocation and a second training attribute associated with a training digital content object search match type, wherein the first training attribute associated with the training digital content object geolocation is generated based at least on location data received from one or more devices having location services circuitry;

training a machine-learning model using each respective subset of significant training attributes to generate a trained machine-learning model;

extracting, by at least one processor, a first device rendered object attribute set associated with the new device rendered object, the first device rendered object attribute set comprising at least a first attribute associated with a digital content object geolocation and at least a second attribute associated with a digital content object search match type related to a type of matching intended for a digital content object interaction with the new digital content object;

transmitting, by the at least one processor, a request for a plurality of related device rendered objects to a device rendered object repository, wherein: the request comprises a device rendered object identifier associated with the new device rendered object, each related device rendered object comprising a set of executable instructions that, when executed by a processor, renders an object for display, wherein each related device rendered object of the plurality of related device rendered objects has a device rendered object attribute set in common with the first device rendered object attribute set, and each related device rendered object has associated therewith a respective related digital content object set comprising a plurality of related digital content objects;

retrieving, by the at least one processor, from the device rendered object repository, the plurality of related device rendered objects;

for each respective related digital content object set of the plurality of related device rendered objects, extracting, by the at least one processor, one or more historical digital content object interaction currency values associated therewith;

programmatically generating, using the trained machine-learning model, and by the at least one processor, an initial electronic bid value for the new electronic digital content object based at least on the first device rendered object attribute set and all of the historical digital content interaction currency values for the plurality of related digital content objects; and transmitting, by the at least one processor, the initial electronic bid value to a computing device.

\* \* \* \* \*